United States Patent
Pakdelbonab et al.

(10) Patent No.: US 10,722,957 B2
(45) Date of Patent: Jul. 28, 2020

(54) DEVICE FOR CUTTING STRUCTURAL STEELS

(71) Applicants: Sohrab Pakdelbonab, Tehran (IR); Mohammadbagher Payganeh, Tehran (IR)

(72) Inventors: Sohrab Pakdelbonab, Tehran (IR); Mohammadbagher Payganeh, Tehran (IR)

( * ) Notice: Subject to any disclaimer, the term of this patent is extended or adjusted under 35 U.S.C. 154(b) by 0 days.

(21) Appl. No.: 15/368,744

(22) Filed: Dec. 5, 2016

(65) Prior Publication Data
US 2017/0136559 A1  May 18, 2017

Related U.S. Application Data

(60) Provisional application No. 62/263,669, filed on Dec. 6, 2015.

(51) Int. Cl.
| | |
|---|---|
| *B23D 15/04* | (2006.01) |
| *B23D 33/02* | (2006.01) |
| *B23D 15/14* | (2006.01) |
| B23D 23/00 | (2006.01) |
| B23D 15/00 | (2006.01) |

(52) U.S. Cl.
CPC ............. *B23D 33/02* (2013.01); *B23D 15/04* (2013.01); *B23D 15/14* (2013.01); *B23D 23/00* (2013.01); *B23D 2015/007* (2013.01); *Y10T 83/412* (2015.04)

(58) Field of Classification Search
CPC ........ B23D 33/02; B23D 15/04; B23D 15/14; B23D 17/00; B23D 23/00
USPC .................... 83/198, 200, 622, 618
See application file for complete search history.

(56) References Cited

U.S. PATENT DOCUMENTS 5,816,126 A * 10/1998 Pluber .................... B26D 1/09
                                                           83/167
6,993,950 B2    2/2006 Bryan
(Continued)

OTHER PUBLICATIONS

Emil Gustafsson, Design and validation of a sheet metal shearing experimental procedure, Journal of Materials Processing Technology, vol. 214, Issue 11, Nov. 2014, pp. 2468-2477.

*Primary Examiner* — Kenneth E Peterson
*Assistant Examiner* — Liang Dong
(74) *Attorney, Agent, or Firm* — Bajwa IP Law Firm; Haris Zaheer Bajwa

(57) ABSTRACT

A cutting device for cutting a number of structural steels in series is disclosed. The cutting device may include a cutting mechanism coupled to an actuating mechanism, both mounted on a support frame. The cutting mechanism may include a stationary cutting member having a plurality of openings and a movable cutting member mounted in side-by-side abutment with the stationary cutting member. Each lateral opening on the stationary cutting member is aligned with the corresponding opening on the movable cutting member, thereby forming a single extended opening, which is capable of receiving a workpiece therein. The movable cutting member is movable relative to the stationary cutting member from a first position to a second position. As the movable cutting member moves, it moves the aligned openings of the individual cutting members out of alignment one after another thereby shearing the workpieces in the process.

11 Claims, 14 Drawing Sheets

(56) References Cited

U.S. PATENT DOCUMENTS

| | | | |
|---|---|---|---|
| 8,037,794 B2 | 10/2011 | Ridolfi et al. | |
| 2002/0157514 A1* | 10/2002 | Ko | B23D 21/00 83/181 |

* cited by examiner

DEVICE FOR CUTTING STRUCTURAL STEELS

CROSS REFERENCE TO RELATED APPLICATION

This application claims the benefit of priority from U.S. Provisional Patent Application Ser. No. 62/263,669, filed on Dec. 6, 2015, and entitled "DEVICE FOR CUTTING STRUCTURAL STEELS," which is incorporated by reference herein in its entirety.

TECHNICAL FIELD

The present disclosure generally relates to devices for cutting a workpiece and more particularly to systems and devices for cutting in series, a plurality of workpieces, such as structural steels, with various sizes and shapes.

BACKGROUND

Structural steels are metallic materials with different sizes and cross sections that are manufactured in standard dimensions. Since various lengths and configurations of structural steels (e.g., rebar, reinforcing rods, etc.) must be embedded within different concrete building components (e.g., concrete foundations, walls, floors, columns, etc.), the structural steels need to be cut into pieces of the required dimensions.

It is desirable to be able to use a single device at the construction site to make the required cuts on various types of structural steel (e.g., rebar, profiles, pipes, etc.). It is further desirable to be able to use a cutting device that is capable of cutting various types of structural steel in series.

SUMMARY

The following brief summary is not intended to include all features and aspects of exemplary embodiments of the present disclosure, nor does it imply that the application must include all features and aspects discussed in this summary.

Disclosed herein is a device for cutting a plurality of workpieces in series. The device according to one or more aspects of the present disclosure may include a support frame, a cutting mechanism having a stationary cutting member and a movable cutting member, where the stationary cutting member may be fixedly coupled to the support frame, and the movable cutting member may be movably mounted on the support frame in side-by-side abutment with the stationary cutting member, and an actuating mechanism interconnected to the movable cutting member that may be configured to move the movable cutting member between a first position and a second position. The stationary cutting member may have a plurality of lateral openings arranged in a linear arrangement thereon that are configured to function as a plurality of cutting heads. The movable cutting member may have a plurality of lateral openings arranged in a linear arrangement thereon. Each of the openings on the movable cutting member may be in alignment with a corresponding opening on the stationary cutting member in the first position defining single passages capable of receiving workpieces therein. The stationary cutting member and the movable cutting member are adapted and positioned to shear the workpieces one after another as the movable cutting member moves from the first position to the second position where all the openings on the movable cutting member have moved out of alignment with the openings on the stationary cutting member.

BRIEF DESCRIPTION OF THE DRAWINGS

While the specification concludes with claims particularly pointing out and distinctly claiming the subject matter that is regarded as forming the present application, it is believed that the application will be better understood from the following description taken in conjunction with the accompanying DRAWINGS, where like reference numerals designate like structural and other elements, in which:

DETAILED DESCRIPTION

Figure 1:
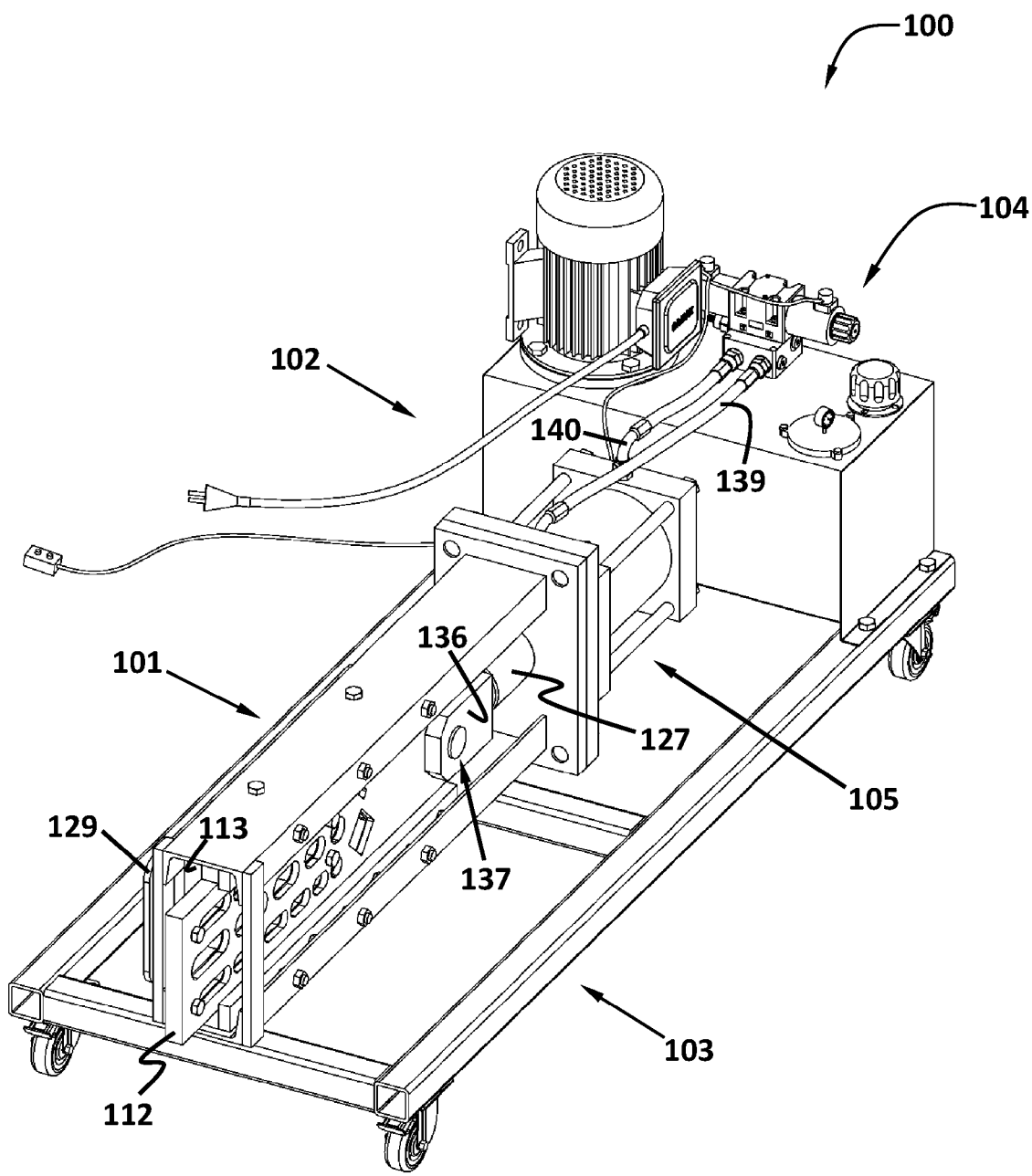
FIG. 1 illustrates one example of a cutting device according to one or more aspects of the present disclosure.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

For purposes of explanation, specific nomenclature is set forth to provide a thorough understanding of the present disclosure. However, it will be apparent to one skilled in the art that these specific details are not required to practice the exemplary embodiment of the present disclosure. Descriptions of specific exemplary embodiments are provided only as representative examples. Various modifications to the preferred implementations will be readily apparent to one skilled in the art, and the general principles defined herein may be applied to other implementations and embodiments without departing from the scope of the present disclosure. Practices according to concepts disclosed by the present disclosure are not intended to be limited to the implementations shown, are to be accorded the widest possible scope consistent with the principles and features disclosed herein.

Disclosed systems and devices are directed to cutting a plurality of various workpieces in series. The systems and devices according to one or more aspects of the present disclosure, may include a cutting mechanism and an actuating mechanism that is coupled with the cutting mechanism and configured to facilitate the mechanical operation of the cutting mechanism. Example implementations of the cutting mechanism may be configured with a stationary cutting member and a movable cutting member mounted in side-by-side abutment. Both the movable cutting member and the stationary cutting member may have a number of lateral openings linearly arranged thereon that extend the full width of the movable cutting member and the stationary cutting member. Each lateral opening on the stationary cutting member may be aligned with the corresponding opening on the movable cutting member, thereby forming a single extended opening, which is capable of receiving a workpiece therein. The movable cutting member may be movable relative to the stationary cutting member from a first position to a second position. As an exemplary movable cutting member moves, it moves the aligned openings of the individual cutting members out of alignment one after another thereby shearing the workpieces in the process. In an aspect, the actuating mechanism may be configured to effectuate movement of the movable cutting member relative to the stationary cutting member. Benefit of this exemplary configuration, may include but is not limited to, providing a cutting mechanism in which a plurality of workpieces in similar or various sizes and cross-sectional shapes may be cut in series.

The following description uses the term "workpiece" to refer to any type of structural workpiece that requires cutting. Examples of such workpieces include rebar, steel angels, profiles, pipes or other relatively thin, elongated members that may be sheared.

FIG. 1 illustrates a perspective view of one implementation of a cutting device 100, according to one or more aspects of the present disclosure. Referring to FIG. 1, cutting device 100 may include cutting mechanism 101 and actuating mechanism 102 that may be both mounted on support frame 103.

Actuating mechanism 102 may be coupled with cutting mechanism 101 and it may be configured to cause cutting mechanism 101 to operate and further its operations as will be described in greater detail in subsequent sections of this disclosure.

In an implementation, actuating mechanism 102 may be a hydraulic actuating mechanism and it may include hydraulic power unit 104 and hydraulic cylinder 105. Hydraulic cylinder 105 may be coupled with cutting mechanism 101 and may be configured to utilize the power supplied by hydraulic power unit 104 to facilitate the mechanical operation of cutting mechanism 101. According to an exemplary implementation shown in FIG. 1, hydraulic cylinder 105 may be a double acting tie rod cylinder. Hydraulic cylinder 105 may be powered by either independent hydraulic power unit 104 mounted to the cutting device 100 (as shown in FIG. 1) or an exemplary hydraulic power system of some other device. Hydraulic cylinder 105 may be in flow communication with hydraulic power unit 104 via two hoses 139 and 140. Therefore, the flow of hydraulic fluid from hydraulic power unit 104 into hydraulic cylinder 105 produces and controls the movement and position of ram 127. Ram 127 may be coupled with cutting mechanism 101.

Figure 2:
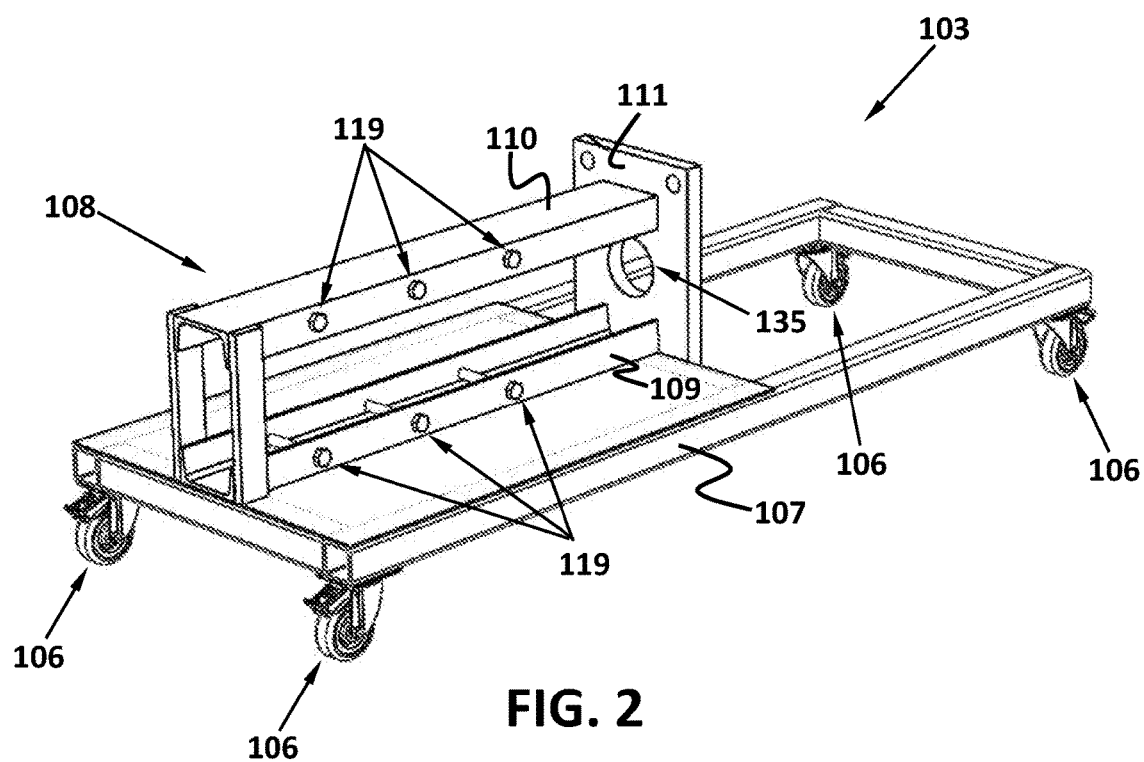
FIG. 2 illustrates one implementation of a support frame, according to one or more aspects of the present disclosure.

FIG. 2 illustrates a perspective view of an implementation of support frame 103. Although support frame 103 may take many forms, according to the implementation shown in this figure, support frame 103 may include base structure 107 that can be structured as a quadrilateral frame and may be configured with, for example a number of wheels 106 to facilitate movement of cutting device 100 around a construction site. In one exemplary implementation, support frame 103, may further include casing structure 108 that maybe mounted on base structure 107. Casing structure 108 may be configured to house cutting mechanism 101. In an implementation, casing structure 108 may include lower attachment member 109, upper attachment member 110, and connecting flange 111. Cutting mechanism 103 may be fixed inside casing structure 104, such that any undesirable motion of cutting mechanism 103 is prevented as will be described in subsequent sections of this disclosure.

Figure 3A:
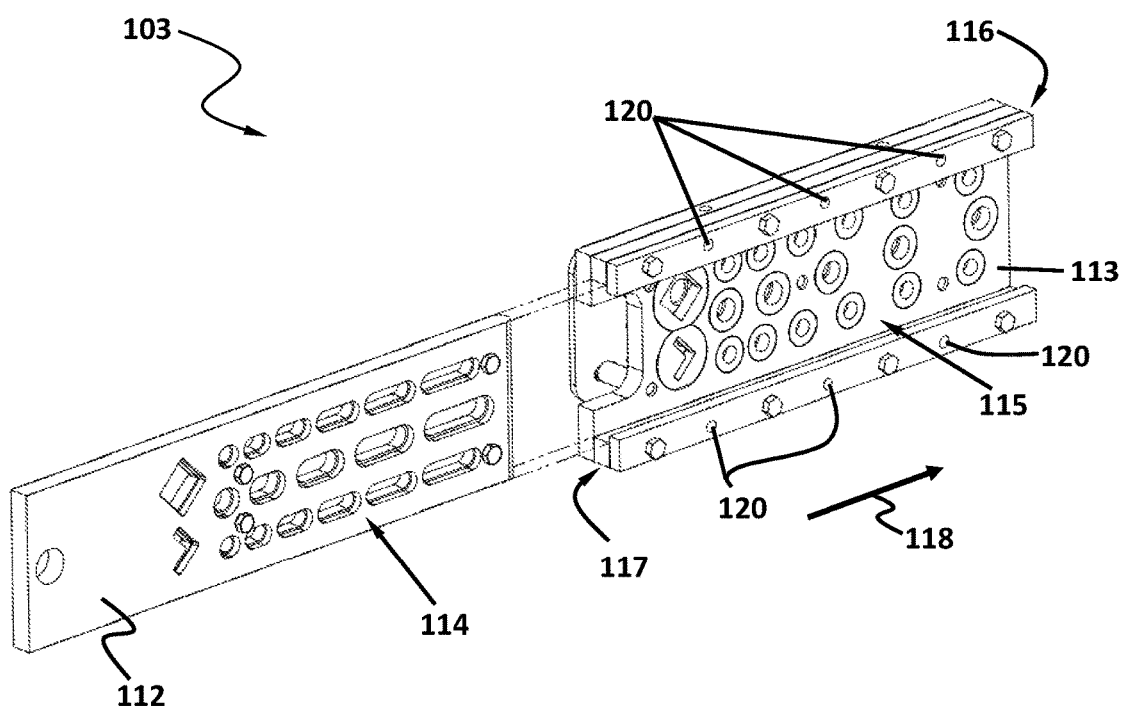
FIGS. 3A and B illustrate an exploded view of an example of a cutting mechanism, according to one or more aspects of the present disclosure.
Figure 3B:
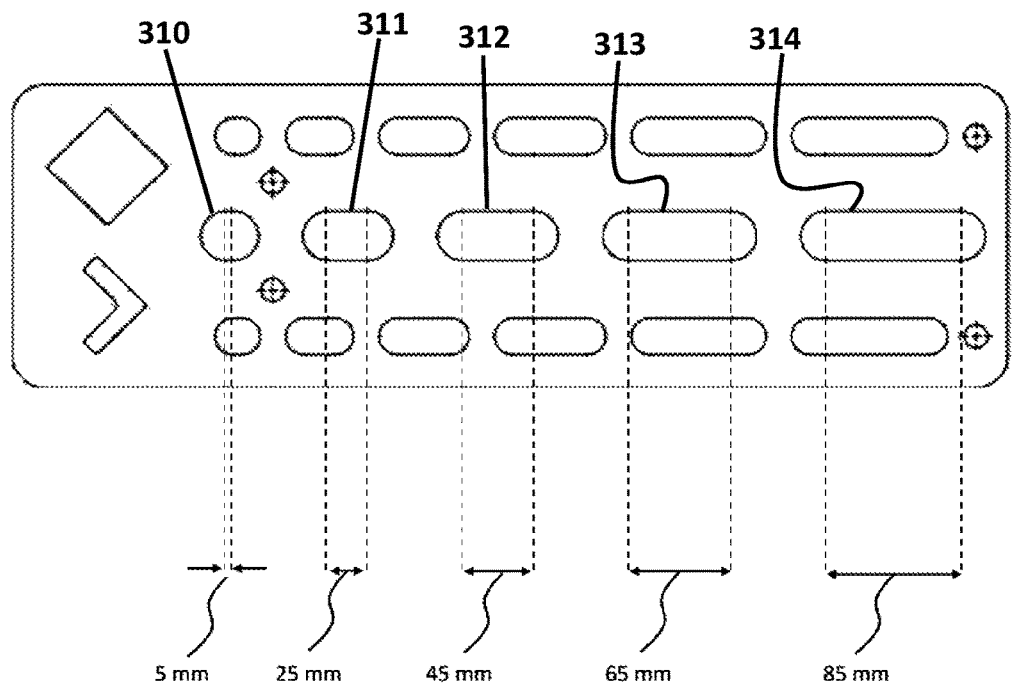
Figure 5:
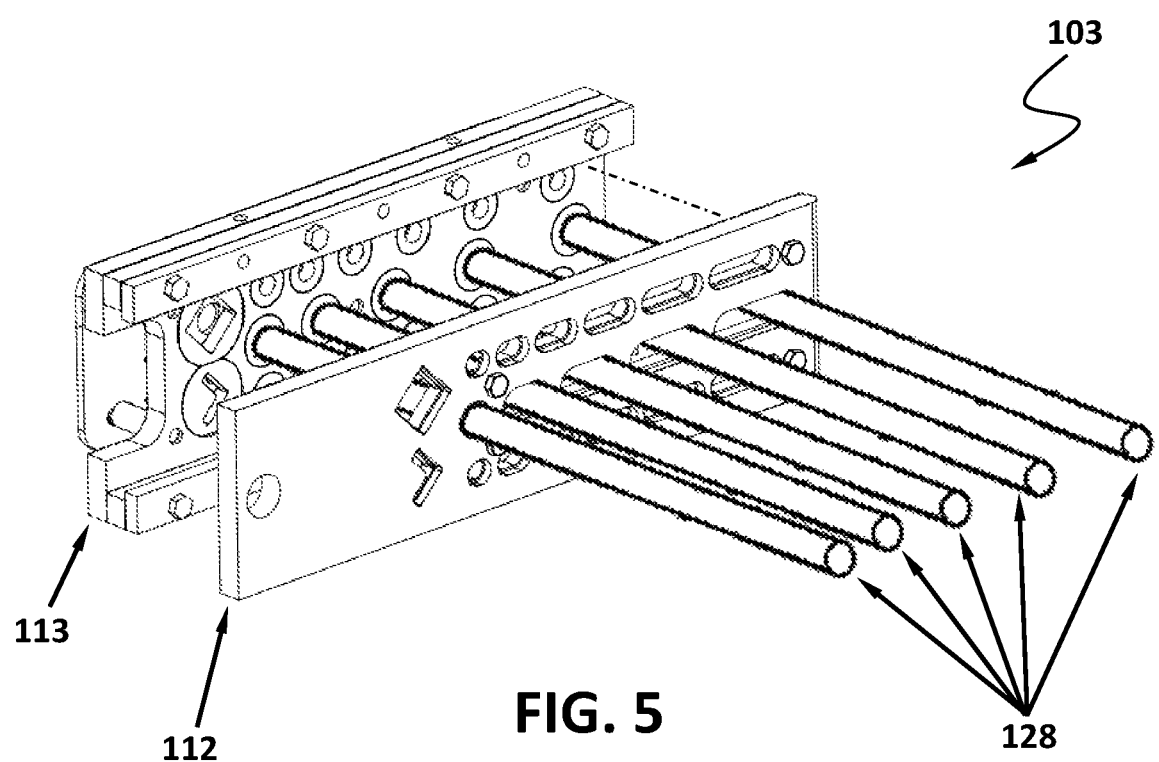
FIG. 5 illustrates an exploded view of one implementation of a cutting mechanism, according to one or more aspects of the present disclosure.

FIG. 3A illustrates an exploded view of an example of cutting mechanism 103, according to one or more aspects of the present disclosure. Referring to the exemplary implementation shown in FIG. 3A, cutting mechanism 103 may include movable cutting member 112 and stationary cutting member 113. Stationary cutting member 113 may have a number of lateral openings 115 thereon that extend the full width of stationary cutting member 113 and may be linearly arranged in a number of rows. FIG. 3B illustrates respective distances between exemplary lateral openings 114 and 115. Lateral openings 301-305 may be similar to lateral openings 115. As illustrated, distance between lateral opening 301 to 302 is 85 mm, 302 to 303 is 105 mm, 303 to 304 is 125 mm, and 304 to 305 is 145. Movable cutting member 112 may have lateral openings 114 thereon that extend the full width of movable cutting member 112 also linearly arranged in a number of rows. Lateral openings 310-314 may be similar to lateral openings 114. As illustrated in FIG. 3B, lengths of lateral openings 114 increases in an arrangement. For example, lateral openings 310, 311, 312, 313, and 314 are displayed. For non-round or straightened aspects of the each of these respective lateral openings, the lengths are 5 mm, 25 mm, 45 mm, 65 mm, and 85 mm respectively. Accordingly, each successive lateral opening 144 has a length 20 mm more than a previous lateral opening. Movable cutting member 112 and stationary cutting member 113 may be mounted in side-by-side abutment in a first position such that each lateral opening on stationary cutting member 113 may be aligned with the corresponding opening on movable cutting member 112, thereby forming a single extended opening, which is capable of receiving a workpiece therein. For example, FIG. 5 illustrates an exploded view of an example of cutting mechanism 100 with a number of workpieces 128 disposed inside the openings formed by the aligned openings on individual cutting members 112 and 113. Referring to FIG. 3A, cutting mechanism 103 may further include upper guide track 116 and lower guide track 117 fastened to stationary cutting member 113 defining a longitudinal passage therebetween. Movable cutting member 112 may be slidably mounted between upper guide track 116 and lower guide track 117, such that the movable cutting member 112 may be movable along the longitudinal passage in a direction shown by arrow 118 form the first position to a second position. Referring to FIGS. 2 and 3A, stationary cutting member 113 may be attached to casing structure 108 and be fixed therein via, for example fastening a number of screws 119 through a number of corresponding screw holes 120 that extend the full width of stationary cutting member 113 and upper and lower guide tracks 116 and 117.

Figure 4:
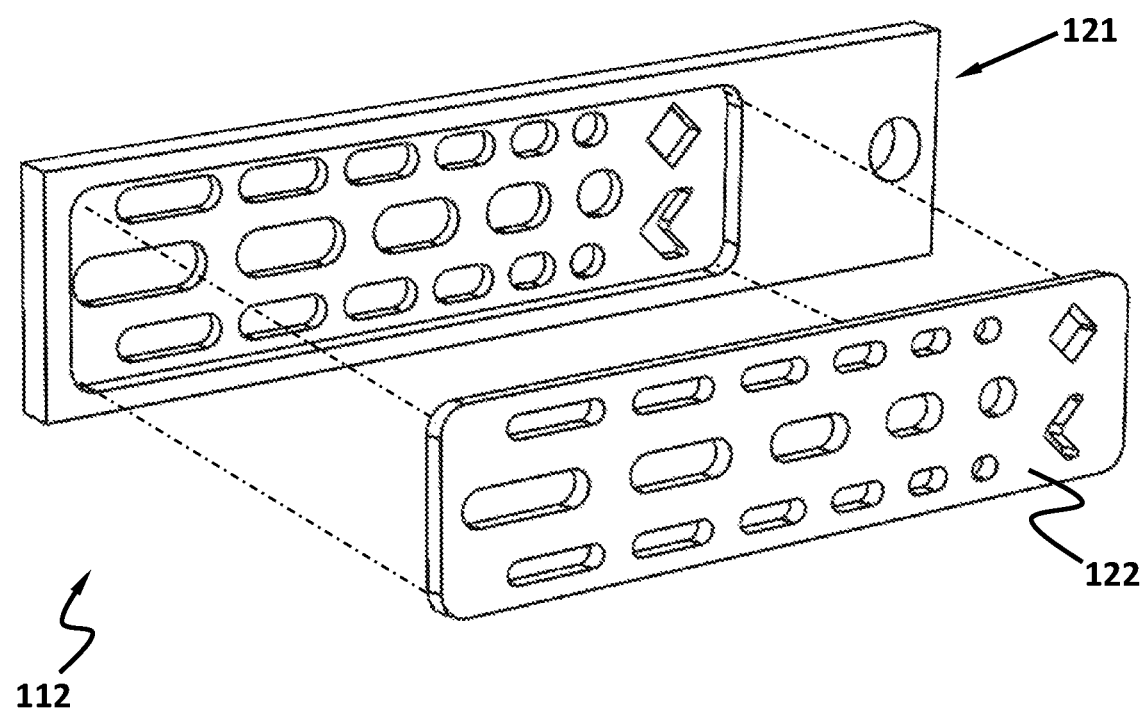
FIG. 4 illustrates an exploded view of one implementation of a movable cutting member, according to one or more aspects of the present disclosure.

FIG. 4 is an exploded view of an example of movable cutting member 112. In the exemplary implementation shown in this figure, the movable cutting member 112 may include slider 121 on which blade segment 122 may be removably mounted. Both slider 121 and blade segment 122 may have similar lateral openings aligned with one another. Blade segment 122 may be made of a material that is sufficiently hard to effect the cut without itself breaking. In an aspect, the removable configuration of blade segment 122 allows for changing cutting segment 122 once it wears due to prolonged use. It should be known to a person skilled in the art that movable cutting member 112 may be structured as one piece in other implementations.

Figure 6:
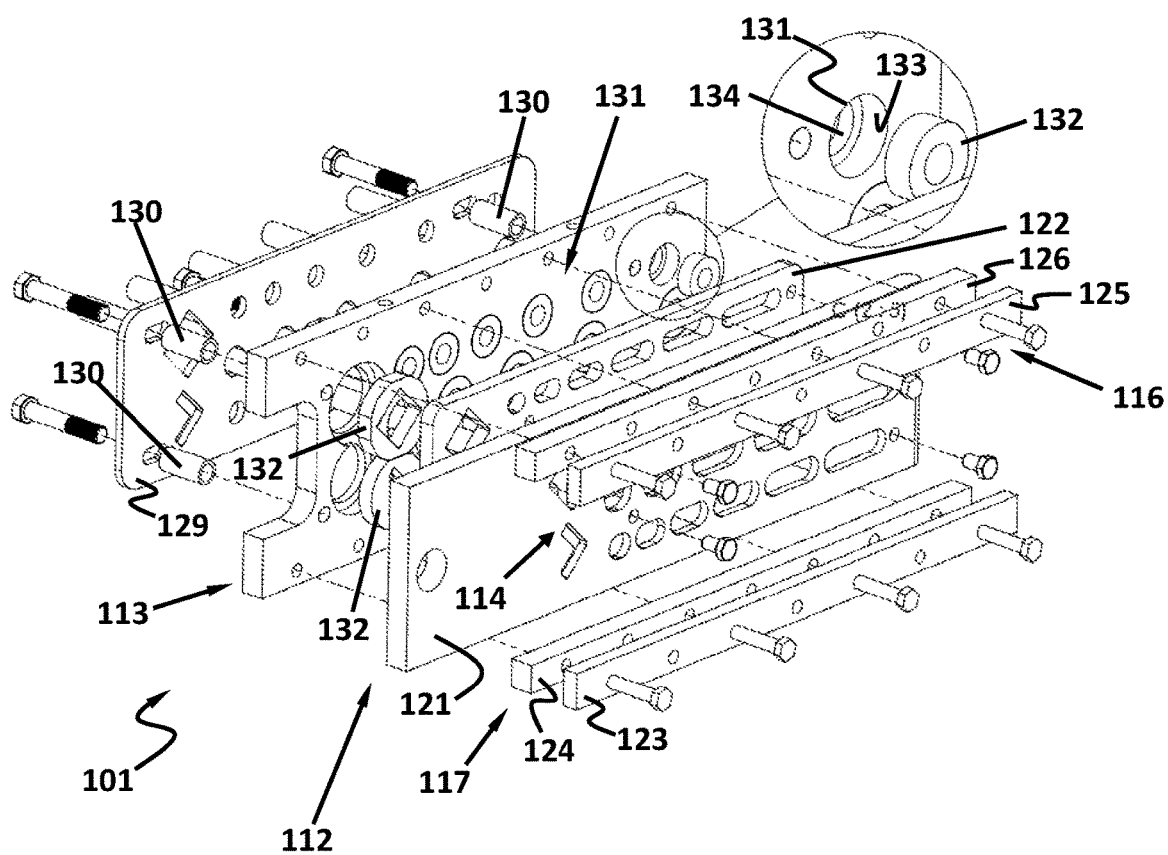
FIG. 6 illustrate an exploded view of one implementation of a cutting mechanism, according to one or more aspects of the present disclosure.

FIG. 6 is an exploded view of an implementation of cutting mechanism 101, according to one or more aspects of the present disclosure. Referring to FIG. 6, lower guide track 117 may include support strip 123 and rail 124 attached thereto. Upper guide track 116 may similarly include support strip 125 and rail 126. Lower and upper guide tracks 117, 116 may be attached to stationary cutting member 113 by, for example screws. Blade segment 122 of movable cutting mechanism 112 may be attached to its slider 121 and movable cutting mechanism 112 may be slidably mounted between upper guide track 116 and lower guide track 117. Cutting mechanism 101 may further include support member 129 having lateral openings thereon that are aligned with the corresponding openings on stationary cutting member 113. Support member 129 may be configured to guide the workpieces inside the openings of cutting members 112, 113 and support the workpieces while they are being cut. Support member 129 may be attached to stationary cutting member 113 using fastening means and a number of spacers 130. Spacers 130 may be used to create a clearance between support member 129 and stationary cutting member 113.

Referring to FIG. 6, according to an implementation, stationary cutting member 113 may be configured with a number of circular lateral openings 131 that are configured for receiving a number of blade pieces 132 therein. Blade pieces 132 may be structured as round pieces capable of being removably placed inside circular openings 131 of the stationary cutting member 113. Each blade piece 132 may have an opening thereon with a unique shape and dimension corresponding to the cross-sectional shape and size of a workpiece to be cut. Blade pieces 132 have sharp inner surfaces suitable for functioning as a cutting head which will be described in detail in connection with FIG. 8. Referring to FIG. 6, each circular opening 131 has two sections, housing section 133 configured for housing blade piece 132 and smaller opening 134 for guiding the workpiece inside blade piece 132. Respective blade pieces 132 may be configured with openings having different shapes corresponding to different cross-sectional shapes and dimensions of structural steels.

Figure 3B:
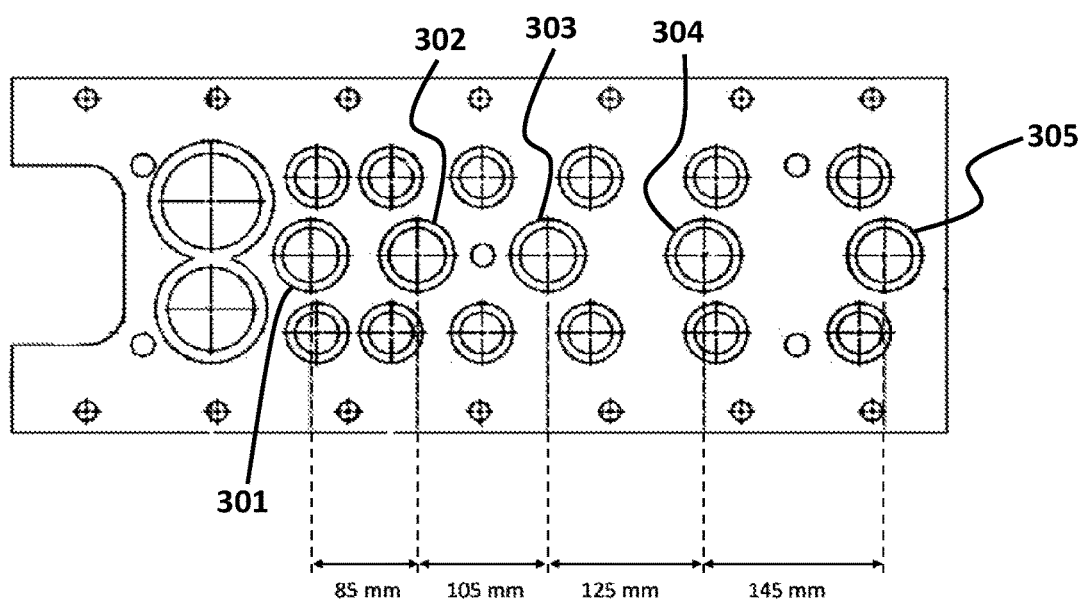

Referring to FIGS. 1, 2, and 3, ram 127 of hydraulic cylinder 105 may pass through an opening 135 in connecting flange 111 and it may be attached to connecting member 136. Connecting member 136 may be configured to couple ram 127 with movable cutting member 112. In an implementation, connecting member 136 may be attached to movable cutting member 112 using, for example pin 137 that is place in pin hole 138 on movable cutting member 112. Ram 127 transfers the linear motion of hydraulic cylinder 105 to movable cutting member 112 during the cutting process.

Figure 7A:
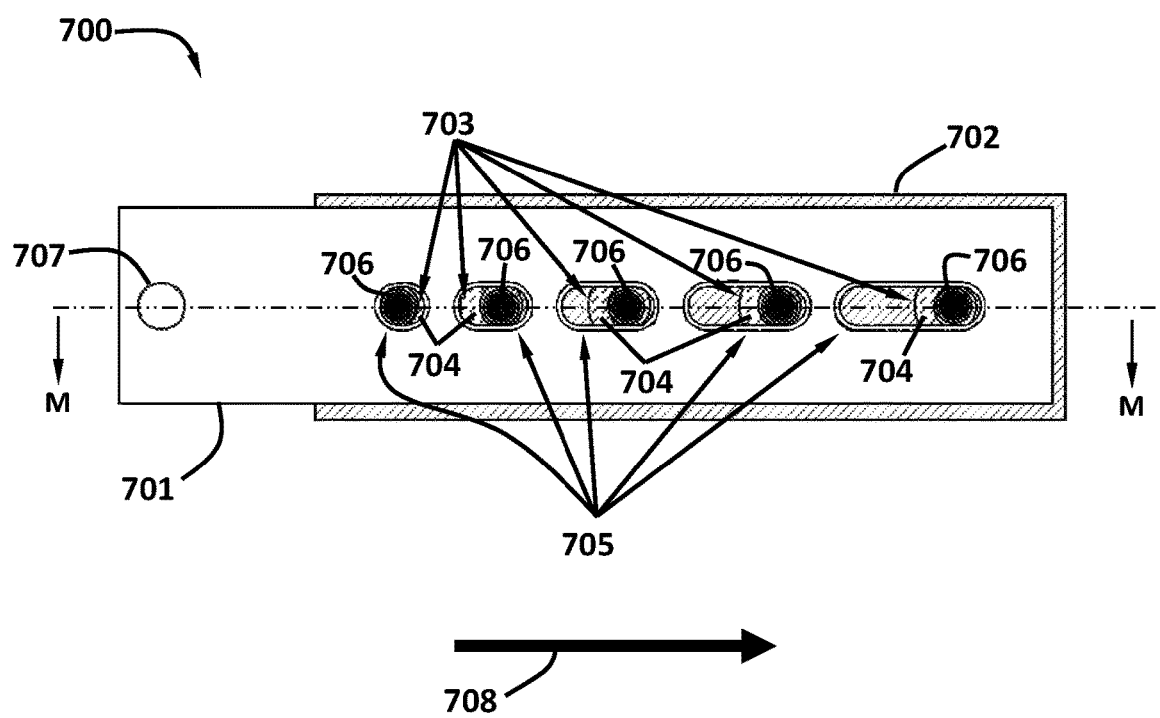
FIG. 7A is a front view of an example of a cutting mechanism in a first position, according to one and more aspects of the present disclosure.
Figure 7B:
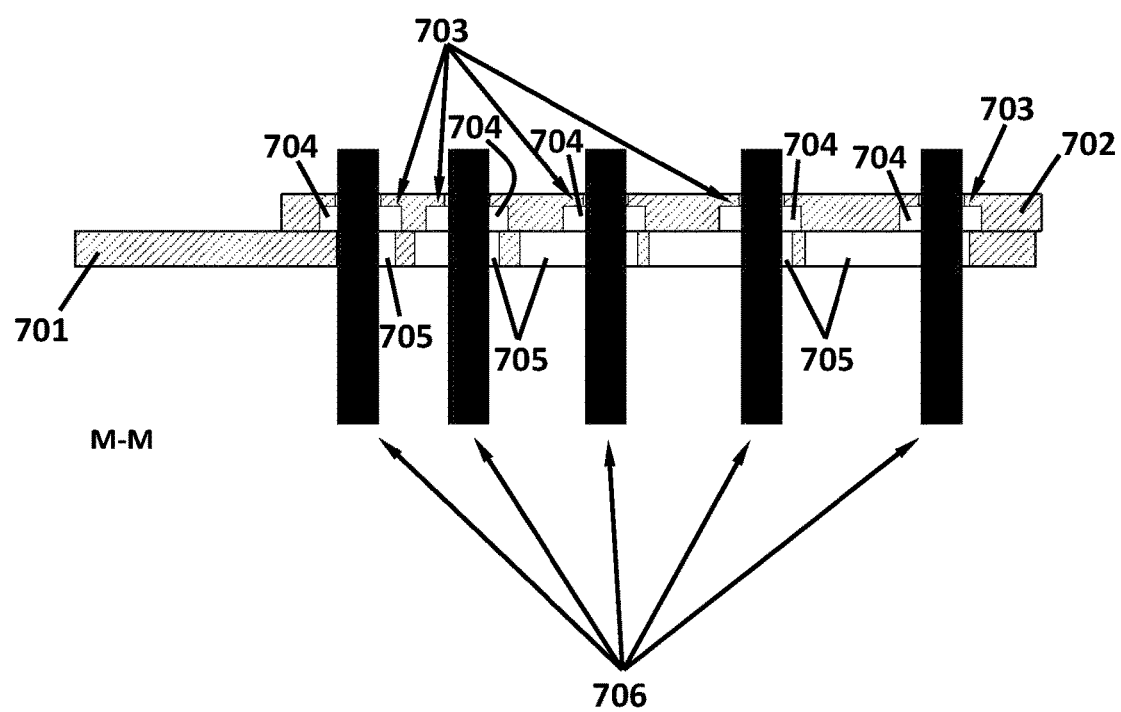
FIG. 7B is a sectional view of the exemplary cutting mechanism of FIG. 7A.

FIGS. 7A-7F are exemplary illustrations of an implementation of the cutting mechanism in different stages of an exemplary cutting process. FIG. 7A illustrates a front view of an example of cutting mechanism 700 for cutting rebar in series. FIG. 7B illustrates a sectional view of the exemplary cutting mechanism 700 of FIG. 7A.

Referring to the implementations shown in FIGS. 7A and 7B, cutting mechanism 700 may include movable cutting member 701 mounted in side-by-side abutment with an exemplary stationary cutting member 702. Stationary cutting member 702 may have a series of lateral openings 703 that are made in a linear arrangement parallel to its longitudinal axis. Blade piece 704 is housed inside each of openings 703. In the implementation shown in this figure, all blade pieces 704 have a circular opening structured to receive a rebar therein. Movable cutting member 701 may also have a series of lateral openings 705 that are made in a linear arrangement and are structured such that the length of each opening 705 increases with respect to its previous opening. As seen in FIG. 7A, movable cutting member 701 and stationary cutting member 702 are in a first position where lateral openings 703 on stationary cutting member 702 are in alignment with openings 705 on movable cutting member 701 such that a number of workpieces 706 may be placed inside the openings created by each pair of corresponding openings 703 and 705 on movable cutting member 701 and stationary cutting member 702. As described in connection with FIGS. 1, 2, and 3, movable cutting member 701 may be coupled with ram 127 of the hydraulic cylinder 105 via connecting member 136 that maybe attached to movable cutting member 701 in pin hole 707. Hydraulic cylinder 105 drives the linear movement of movable cutting member 701 forward in the direction shown by arrow 708 from the first position as shown in FIG. 7A to a second position where all corresponding openings 703, 705 have moved out of alignment.

Figure 7C:
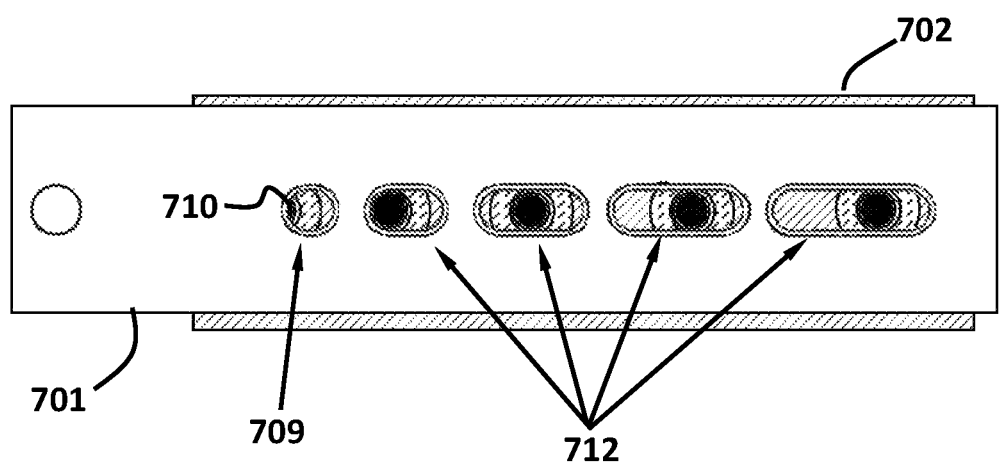
FIGS. 7C-7F illustrate front views of an exemplary cutting mechanism in different positions during a cutting process, according to one and more aspect of the present disclosure.
Figure 7D:
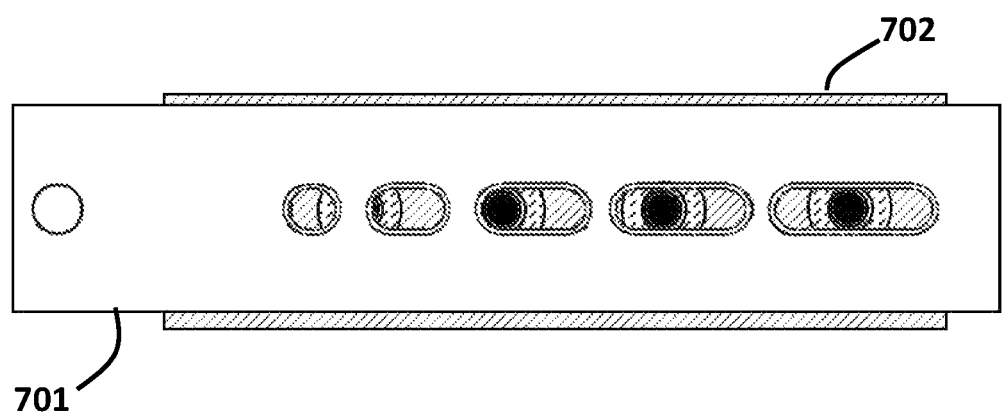
Figure 7E:
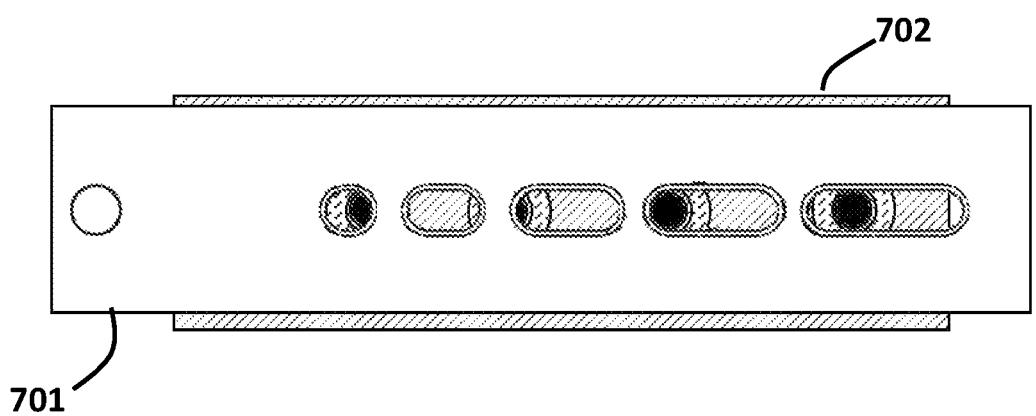
Figure 7F:
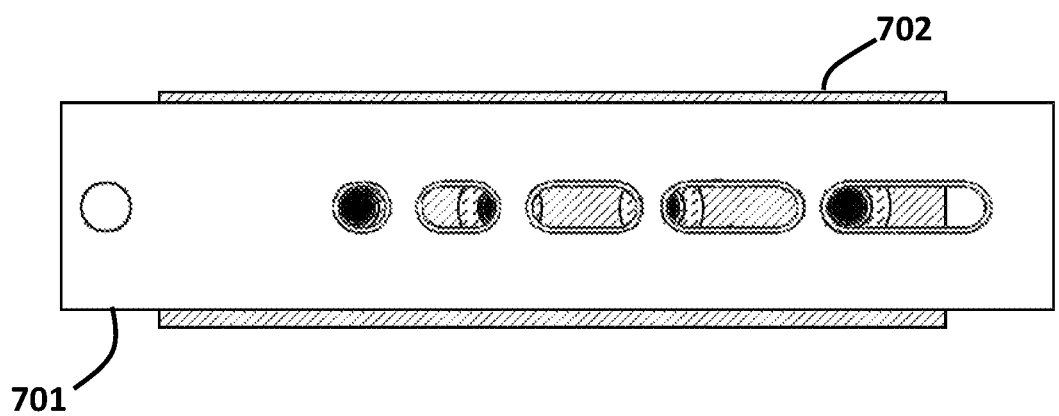
Figure 8:
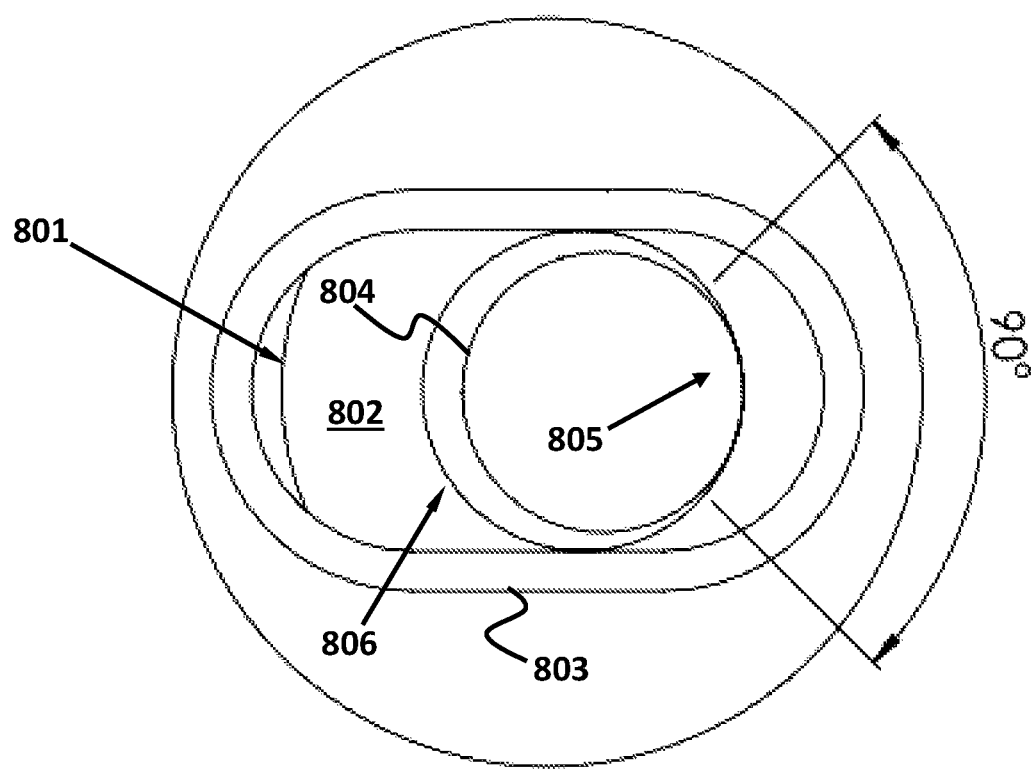
FIG. 8 illustrate exemplary lateral openings of the stationary cutting member and the movable cutting member forming a single passage with a workpiece placed therein.

As movable cutting member 701 moves from the first position in FIG. 7A to the position shown in FIG. 7C, it moves the first set of openings 709 out of alignment thereby cutting the workpiece 710 disposed inside the openings 709. FIG. 8 illustrates an enlarged view of one lateral opening 801 of the stationary cutting member with blade piece 802 with an opening 806 thereon placed inside it and one opening 803 on the movable cutting member and workpiece 804 that is disposed inside the openings 806 and 803. As seen in FIG. 8, a portion of the opening 806 may act as cutting head 805, for example, a 90° arc as shown in this figure. Referring to FIGS. 7A and 8, as the hydraulic cylinder urges the movable cutting member 701 to move in the direction shown by arrow 708, workpiece 804 is forced into cutting head 805 by opening 803 on the movable blade and thereby is sheared as the two openings 806, 803 move out of alignment.

Referring to FIG. 7C, the openings on the movable blade are structured such that the length of each opening increases with respect to its previous opening. Therefore, once the first set of openings 709 move out of alignment, the rest of the openings 712 are still aligned. Moving on to the positions shown sequentially in FIGS. 7D-7F, during the cutting process in each row of the openings, only one workpiece is subjected to the shearing at a time and thereby workpieces placed in a row of the openings on the cutting members 701 and 702 are cut in series one after another.

Referring to FIG. 6, blade pieces 132 inside lateral openings 131 of stationary cutting member 113 are removably housed inside openings 131; this removable configuration of blade pieces 132 allows for changing blade pieces 132 once they wear due to prolonged use. It should be known to a person skilled in the art that the stationary cutting member may function as an integrated cutting member such that lateral openings 131 of stationary cutting member 113 themselves may be shaped with different cross-sectional shapes and sizes of structural steels and may be structured to act as the cutting heads without the need for placing blade pieces 132 inside them, according to other implementations.

The term "lateral openings" or "opening" are used herein interchangeably, may refer to any hole, orifice, gap, slot, aperture or space. In particular embodiments, it means a hole with an open end to allow for passing the exemplary workpieces. In an embodiment of the present disclosure, the openings may have various cross sectional shapes and dimensions. The exemplary openings according to different implementations of the present disclosure, may have a thickness capable to provide enough strength and solidity for cutting structural steels.

It should be known that the structure, size, cross sectional shape of the openings as well as the distance between the openings on the cutting members, may be application-specific and are not limited to the implementations shown in the drawings.

It should be known by a person skilled in the art upon reading this disclosure that the plurality of openings in the cutting members can be designed with various shapes and sizes. For example, the openings may be structured for cutting steel profiles, steel angles, or rebar with different diameters.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 105 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus the following claims are hereby incorporated into the Detailed Description, with each claim standing on its own as a separately claimed subject matter.

What is claimed is:

1. A device for cutting a plurality of workpieces in series, the device comprising:
    a support frame;
        a cutting mechanism having a stationary cutting member and a movable cutting member, the stationary cutting member being fixedly coupled to the support frame, the movable cutting member being movably mounted on the support frame in side-by-side abutment with the stationary cutting member; and
        an actuating mechanism interconnected to the movable cutting member, configured to move the movable cutting member between a first position and a second position,
    wherein:
        the stationary cutting member with a first set of plurality lateral openings of a circular shape arranged in a linear arrangement thereon that are configured to function as a plurality of cutting heads;
        each of a second set of plurality of openings on the movable cutting member is in alignment with a corresponding opening of the first set of plurality of lateral openings on the stationary cutting member in the first position defining single passages capable of receiving workpieces therein, the second set of plurality of openings comprising openings of oval shapes, wherein each successive opening is of a larger size than a previous opening; and
        the stationary cutting member and the moveable cutting member adapted and positioned to shear the workpieces one after another as the movable cutting member moves from the first position to the second position.

2. The device of claim 1, wherein:
    respective distances between successive lateral openings in the first set of plurality of lateral openings increase by 20 mm and respective lengths of successive lateral openings in the second set of plurality of lateral openings increase by 20 mm.

3. The device of claim 2, wherein:
    a first distance between a first lateral opening and a second lateral opening of the first set of plurality of lateral openings is 45 mm, and a second distance between the second lateral opening and a third lateral opening of the first set of plurality of lateral openings is 65 mm.

4. The device of claim 2, wherein:
    the first set of plurality of lateral openings and the second plurality of lateral openings comprises of multiple rows of lateral openings.

5. The device of claim 4, wherein the multiple rows of lateral openings comprises of three rows of lateral openings.

6. The device of claim 4, wherein each of the first set of plurality of lateral openings is circular.

7. The device of claim 2, wherein the cutting mechanism further comprises blade pieces in each of first set of plurality of lateral openings.

8. The device of claim 1, wherein the actuating mechanism comprises a hydraulic power unit and a hydraulic cylinder, the hydraulic cylinder coupled to the cutting mechanism and configured to utilize power from the hydraulic power unit to facilitate mechanical operation of the cutting mechanism.

9. The device of claim 8, wherein the hydraulic cylinder is configured to move the movable cutting member between a first position and a second position.

10. The device of claim 9, wherein the hydraulic cylinder is configured to move the movable cutting member between the second position position and a third position.

11. The device of claim 10, further comprising:
a ram coupled to the hydraulic cylinder and the moveable cutting member.

* * * * *